(12) United States Patent
Lin

(10) Patent No.: US 11,161,372 B1
(45) Date of Patent: Nov. 2, 2021

(54) CASTOR WITH A BRAKE PAD

(71) Applicant: CATIS PACIFIC MFG. CORP. LTD., Yunlin County (TW)

(72) Inventor: Ching Sung Lin, Yunlin County (TW)

(73) Assignee: CATIS PACIFIC MFG. CORP. LTD., Douliou (TW)

(*) Notice: Subject to any disclaimer, the term of this patent is extended or adjusted under 35 U.S.C. 154(b) by 0 days.

(21) Appl. No.: 17/248,321

(22) Filed: Jan. 20, 2021

(51) Int. Cl.
*B60B 33/00* (2006.01)
*B60B 33/02* (2006.01)

(52) U.S. Cl.
CPC ...... *B60B 33/0081* (2013.01); *B60B 33/0039* (2013.01); *B60B 33/0078* (2013.01); *B60B 33/0086* (2013.01); *B60B 33/025* (2013.01)

(58) Field of Classification Search
CPC ... B60B 33/021; B60B 33/023; B60B 33/025; B60B 33/0039; B60B 33/0081; B60B 33/0078; B60B 33/0086
See application file for complete search history.

(56) References Cited

U.S. PATENT DOCUMENTS

| | | | | |
|---|---|---|---|---|
| 4,494,272 A | * | 1/1985 | Morita | B60B 33/021 16/35 R |
| 6,810,560 B1 | * | 11/2004 | Tsai | B60B 33/0021 16/20 |
| 8,220,110 B1 | * | 7/2012 | Chen | B60B 33/0068 16/35 R |
| 8,850,657 B1 | * | 10/2014 | Yang | B60B 33/021 16/35 R |
| 9,038,785 B2 | * | 5/2015 | Lin | B60B 33/021 188/1.12 |
| 9,090,125 B2 | * | 7/2015 | Block | B60B 33/0018 |
| 9,139,044 B1 | * | 9/2015 | Tsai | B60B 33/0081 |
| 10,434,820 B1 | * | 10/2019 | Savruha | B60B 33/0002 |
| 2009/0019670 A1 | * | 1/2009 | Tsai | B60B 33/0081 16/35 R |
| 2013/0212834 A1 | * | 8/2013 | Chen | B60B 33/0039 16/45 |

* cited by examiner

*Primary Examiner* — Jeffrey O'Brien
(74) *Attorney, Agent, or Firm* — Wang Law Firm, Inc.

(57) ABSTRACT

A castor with a brake pad is disclosed, wherein the fixing sections and the pressing sections of the brake pad press against the two wheel-side portions of the wheel body, so in addition to providing friction, it can also provide clamping function, as a result, the braking effect can be achieved more easily, and the braking force tends to be even. Furthermore, because the fixing sections and the pressing sections of the brake pad press against the two wheel-side portions instead of pressing against the center of the wheel body, so no extra resistance is generated, and there is no excess wear, thereby extending the service life of the wheel body.

7 Claims, 8 Drawing Sheets

CASTOR WITH A BRAKE PAD

BACKGROUND

Field of the Invention

The present invention relates to a brake structure, and more particularly to a castor with a brake pad.

Related Prior Art

Generally, in order to make the carrier (patient bed, precision instrument or workbench, etc.) easy to move effortlessly, castors are usually mounted to the bottom of the carrier. The castors at the beginning are of a fixed and non-steerable design, which causes the carriers to be only able to move straight without turning. For this reason, a type of steerable castor has been developed on the market to enable the carrier to turn when the carrier is moving. Then, in order to prevent the castors from undesired moving due to uneven ground or other factors when it is stationary, a castor with a brake paddle was invented, which allows people to control the braking stop after the carrier is displaced.

The conventional brake mechanism of castors can be divided into two types, one of which is such that the brake disc is provided with brake teeth for engaging with the gear inside the wheel to prevent the castor from rolling. The other uses the brake pad to press directly against the wheel. However, the brake pad of this type of brake mechanism is pressed against the center of the wheel body during braking, which causes uneven braking force and requires a large amount of force to be able to brake. Therefore, a castor structure with even braking force is demanded.

SUMMARY

The present invention provides a castor structure with a brake pad, and the objective of which is to provide a castor structure with an uniform and consistent braking force and easy braking.

To achieve the above objective, a castor structure with a brake pad in accordance with the present invention comprises:

a housing including two side walls and a through hole, wherein a space is defined between the two side walls, and each of the two side walls includes a coupling portion;

a pivoting unit including a ball unit, a pivot shaft, and an upper cover, wherein the ball unit is fixedly disposed inside the upper cover, the pivot shaft is inserted in the upper cover, and the upper cover is disposed in the through hole and fixed to the housing;

a toothed wheel disposed in the housing and including a plurality of teeth, wherein the pivot shaft is inserted through the toothed wheel;

a wheel body pivotally disposed between the two side walls of the housing and having a thickness, wherein a central line is defined at half the thickness of the wheel body, and portions of the wheel body at two sides of the central line are two wheel-side portions;

the brake pad including a first end and a second end opposite to each other, wherein the first end is formed with a plurality of locking teeth for engaging with the teeth of the toothed wheel, the second end includes two opposite braking portions, each of the two braking portions includes a force-receiving section, a fixing section, and a pressing section respectively, a space is defined between the two force-receiving sections, a gap is formed between the two pressing sections and in communication with the space of the brake pad, one end of each of the force-receiving sections connected to a corresponding one of the fixing sections is a first connecting end, another end of each of the force-receiving sections is a second connecting end, the first connecting end is closer to the wheel body than the second connecting end, one end of each of the pressing sections is connected to a corresponding one of the fixing sections, another end of each of the pressing sections faces a brake pedal or a brake-release pedal, each of the pressing sections is inclined with respect to a corresponding one of the fixing sections, an elastic portion is disposed between the first end and the second end, one end of the elastic portion is connected between the first end and the second end, another end of the elastic portion abuts against the housing, and a shaft hole is formed between the first end and the second end;

a first pivot inserted through the shaft hole of the brake pad, and including one end fixed to the coupling portion of one of the side walls, and another end fixed to the coupling portion of another of the side walls;

one end of the brake pedal including a first inserting hole, an abutting portion, a limiting portion and a pressing portion, wherein a recess is formed between the abutting portion and the limiting portion, the brake pedal is accommodated between the two side walls, the pressing portion of the brake pedal faces the force-receiving sections and is provided for pushing the force-receiving sections;

a second pivot inserted through the first inserting hole, and including one end fixed to the coupling portion of one of the side walls and another end fixed to the coupling portion of another of the side walls;

the brake-release pedal including a paddle portion and a body portion, wherein a second inserting hole is formed at a first end of the brake-release pedal, the body portion is formed on one side of the paddle portion, the second inserting hole runs through the body portion, the body portion includes a first convex portion and a second convex portion, a first concave portion is formed between the paddle portion and the first convex portion, a second concave portion is formed between the first convex portion and the second convex portion, the first concave portion is provided for receiving the abutting portion, the second concave portion is provided for accommodating the limiting portion, the limiting portion is provided for abutting against the first convex portion, and the brake-release plate is disposed between the two side walls; and a third pivot inserted through the second inserting hole, and including one end fixed to the coupling portion of one of the side walls and another end fixed to the coupling portion of another of the side walls.

From the foregoing, it can be seen that the fixing sections and the pressing sections of the brake pad press against the two wheel-side portions of the wheel body, so in addition to providing friction, it can also provide clamping function, as a result, the braking effect can be achieved more easily, and the braking force tends to be even. Furthermore, because the fixing sections and the pressing sections of the brake pad press against the two wheel-side portions instead of pressing against the center of the wheel body, so no extra resistance is generated, and there is no excess wear, thereby extending the service life of the wheel body.

DETAILED DESCRIPTION

Figure 1:
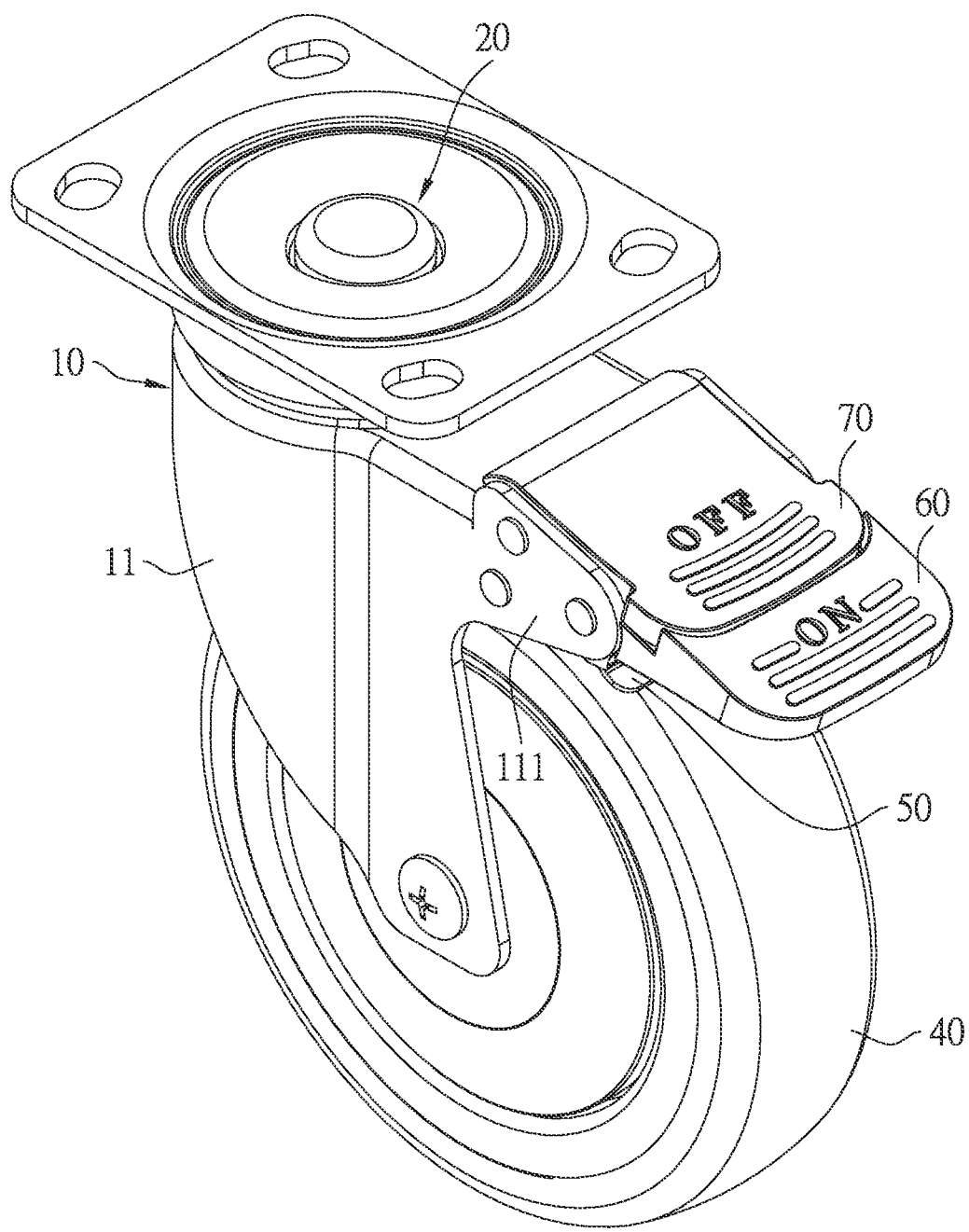
FIG. 1 is a perspective view of a castor structure with a brake pad in accordance with the present invention.
Figure 2:
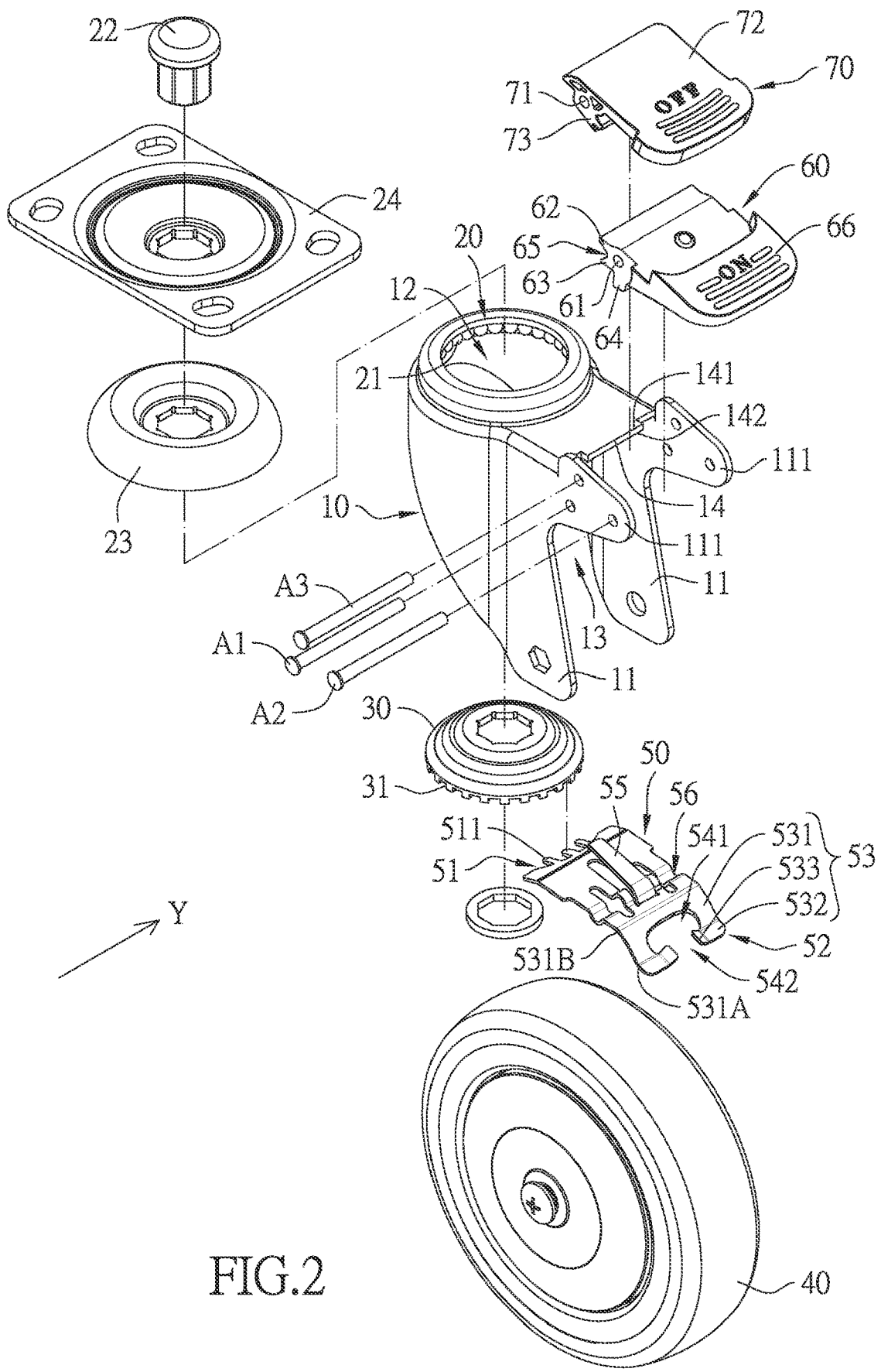
FIG. 2 is an exploded view of the castor structure with a brake pad in accordance with the present invention.
Figure 3:
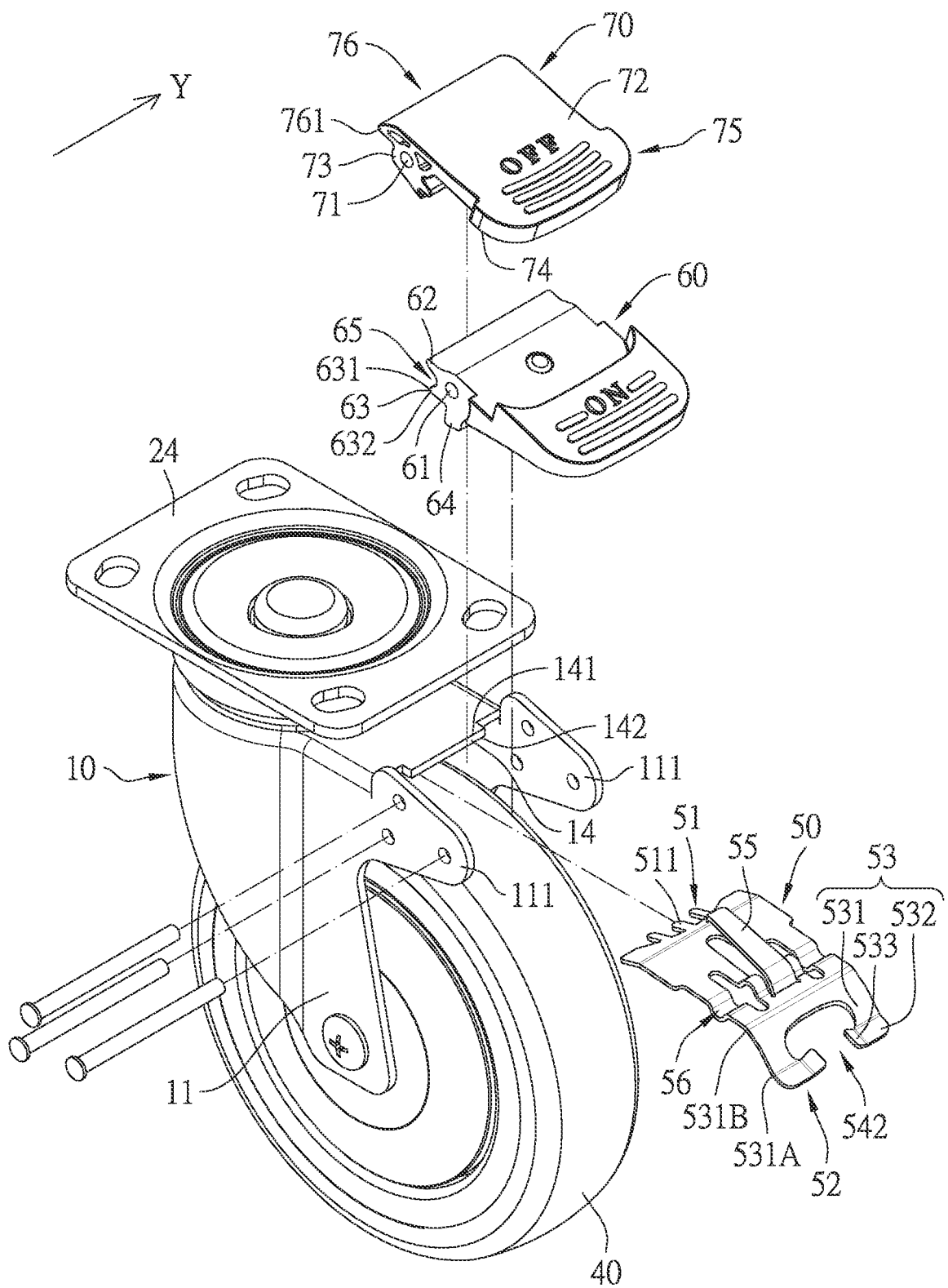
FIG. 3 is an exploded view of the castor structure with a brake pad in accordance with the present invention.
Figure 4:
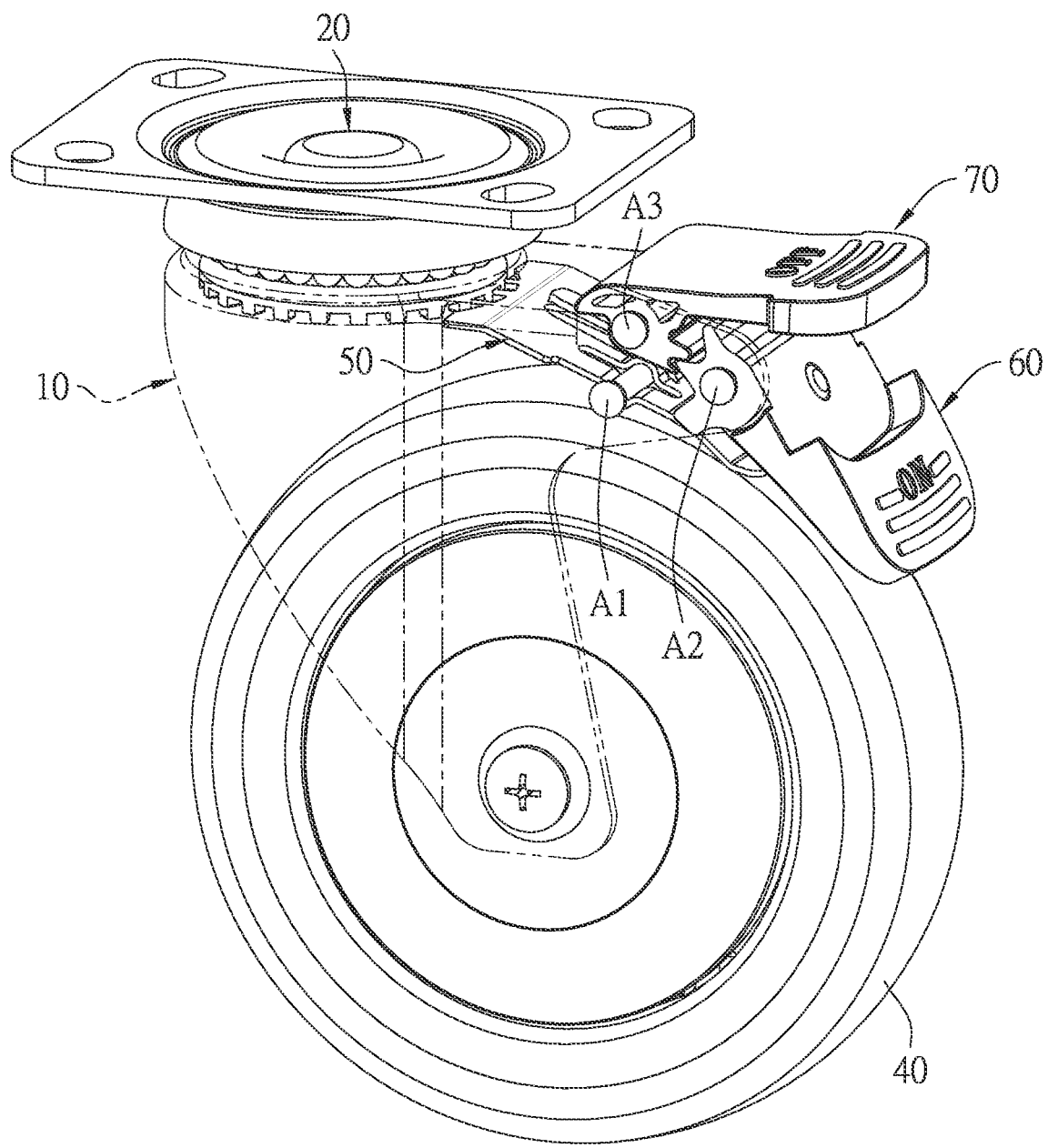
FIG. 4 is a schematic diagram of the castor structure with a brake pad in accordance with the present invention.

The present invention will be clearer from the following description when viewed together with the accompanying drawings, which show, for purpose of illustrations only, the preferred embodiment in accordance with the present invention.

Referring to FIGS. 1-8, a castor structure with a brake pad in accordance with the present invention comprises: a housing 10, a pivoting unit 20, a toothed wheel 30, a wheel body 40, the brake pad 50, a brake pedal 60, a brake-release pedal 70, a first pivot A1, a second pivot A2, and a third pivot A3.

The housing 10 includes: two side walls 11, a through hole 12 and a space 13 defined between the two side walls 11, and each of the two side walls 11 includes a coupling portion 111.

The pivoting unit 20 includes a ball unit 21, a pivot shaft 22, and an upper cover 23. The ball unit 21 is adapted to enable the upper cover 23 to rotate relative to the housing 10, and the ball unit 21 is fixedly arranged inside the upper cover 23. The pivot shaft 22 is inserted in the upper cover 23, the upper cover 23 is disposed in the through hole 12 and fixed to the housing 10, and a mounting plate 24 is mounted to the pivoting unit 20 for connecting objects.

The toothed wheel 30 is disposed in the housing 10 and penetrated by and able to rotate with the pivot shaft 22. The toothed wheel 30 includes a plurality of teeth 31 and is able to rotate relative to the housing 10. In a specific embodiment, there is a second ball unit 25 between the toothed wheel 30 and the housing 10.

The wheel body 40 is pivotally disposed between the two side walls 11 of the housing 10, the wheel body 40 has a thickness, and a central line 41 is defined at half the thickness of the wheel body 40. The portions of the wheel body 40 at two sides of the central line 41 are two wheel-side portions 42.

The brake pad 50 includes a first end 51 and a second end 52 opposite to each other. The first end 51 is formed with a plurality of locking teeth 511 for engaging with the teeth 31 of the toothed wheel 30. The second end 52 includes two opposite braking portions 53, each of the two braking portions 53 includes a force-receiving section 531, a fixing section 532, and a pressing section 533 respectively. There is a space 541 between the two force-receiving sections 531, a gap 542 is formed between the two pressing sections 533 and in communication with the space 541. One end of each of the force-receiving sections 531 connected to a corresponding one of the fixing sections 532 is a first connecting end 531A, another end of each of the force-receiving sections 531 is a second connecting end 531B, and the first connecting end 531A is closer to the wheel body 40 than the second connecting end 531B. Each of the fixing sections 532 extends along a transverse direction Y, one end of each of the pressing sections 533 is connected to a corresponding one of the fixing sections 532, and another end of each of the pressing sections 533 faces the brake pedal 60 or the brake-release pedal 70. Each of the pressing sections 533 is inclined with respect to a corresponding one of the fixing sections 532. There is an elastic portion 55 between the first end 51 and the second end 52. One end of the elastic portion 55 is connected between the first end 51 and the second end 52, another end of the elastic portion 55 abuts against the housing 10, and a shaft hole 56 is formed between the first end 51 and the second end 52 and extends along the transverse direction Y.

Preferably, the elastic portion 55 is an elastic piece located between the first end 51 and the second end 52.

The first pivot A1 is inserted through the shaft hole 56 of the brake pad 50, and includes one end fixed to the coupling portion 111 of one of the side walls 11 and another end fixed to the coupling portion 111 of another of the side walls 11.

One end of the brake pedal 60 includes a first inserting hole 61, an abutting portion 62, a limiting portion 63 and a pressing portion 64. The abutting portion 62 and the limiting portion 63 are generally in the shape of a convex tooth, and a recess 65 is formed between the abutting portion 62 and the limiting portion 63. Another end of the brake pedal 60 is provided with a plurality of anti-slip grooves 66 on an outer surface thereof, and the brake pedal 60 is accommodated between the two side walls 11, in such a manner that the pressing portion 64 of the brake pedal 60 is located corresponding to the force-receiving sections 531 of the brake portions 53, and faces the force-receiving sections 531, and is provided for pushing the force-receiving sections 531.

The second pivot A2 is inserted through the first inserting hole 61, and includes one end fixed to the coupling portion 111 of one of the side walls 11 and another end fixed to the coupling portion 111 of another of the side walls 11, so that the brake pedal 60 is able to pivot about the second pivot A2.

The brake-release pedal 70 includes a force-receiving end and a working end. The working end includes a second inserting hole 71. The brake-release pedal 70 includes a paddle portion 72 and a body portion 73. The body portion 73 is formed on one side of the paddle portion 72. The second inserting hole 71 runs through the body portion 73. The body portion 73 includes a first convex portion 731 and a second convex portion 732. A first concave portion 733 is formed between the paddle portion 72 and the first convex portion 731, and a second concave portion 734 is formed between the first convex portion 731 and the second convex portion 732. The first concave portion 733 is provided for receiving the abutting portion 62, the second concave portion 734 is provided for accommodating the limiting portion 63, the limiting portion 63 is provided for abutting against the first convex portion 731, and the brake-release plate 70 is disposed between the two side walls 11.

The third pivot A3 is inserted through the second inserting hole 71, and includes one end fixed to the coupling portion 111 of one of the side walls 11 and another end fixed to the coupling portion 111 of another of the side walls 11, so that the brake-release pedal 70 is able to pivot about the third pivot 43.

In a preferred embodiment, the first pivot A1, the second pivot A2, and the third pivot A3 are equal in length, and the first pivot A1, the second pivot A2, and the third pivot A3 are similarly fixed to the coupling portion 111 of one of the side walls 11 with one end, and fixed to the coupling portion 111 of the other of the side walls 11 with the other end, so that the first pivot A1, the second pivot A2, and the third pivot A3 can be riveted to the two side walls 11 at the same time through the machine during processing, and then simplify the processing flow.

In a specific embodiment, the limiting portion 63 is a protruding sharp or rounded corner, and the limiting portion 63 includes a top surface 631 and a bottom surface 632 opposite to each other. The top surface 631 is provided for abutting against the first convex portion 731, and the bottom surface 632 is provided for abutting against the second convex portion 732. When the brake pedal 60 is stepped on by the user, the top surface 631 pushes the first convex portion 731 to limit the brake pedal 60 from continuing to rotate to prevent the brake pedal 60 from rotating too much. In addition, when the brake pedal 60 is stepped on by the user, the user's foot will be located between the brake pedal 60 and the brake-release pedal 70. Because of this, the user's instep can easily press against a lower side 74 of the brake-release pedal 70, and the lower side 74 is the side facing the brake pedal 60. In this way, it is easy to make the brake-release pedal 70 rotate counterclockwise about the third pivot A3 (according to FIGS. 5 and 6), and when the brake-release pedal 70 rotates until the second convex portion 732 engages the bottom surface 632, it will be stopped by the limiting portion 63 to prevent the brake-release pedal 70 from rotating excessively beyond the predetermined stroke, thereby avoiding the negative effect caused by the brake-release pedal 70 rotating beyond the predetermined stroke. That is, the first convex portion 731 is disengaged away from the top surface 631, so that the brake pedal 60 cannot be effectively reset when the brake-release pedal 70 is stepped on.

Figure 5:
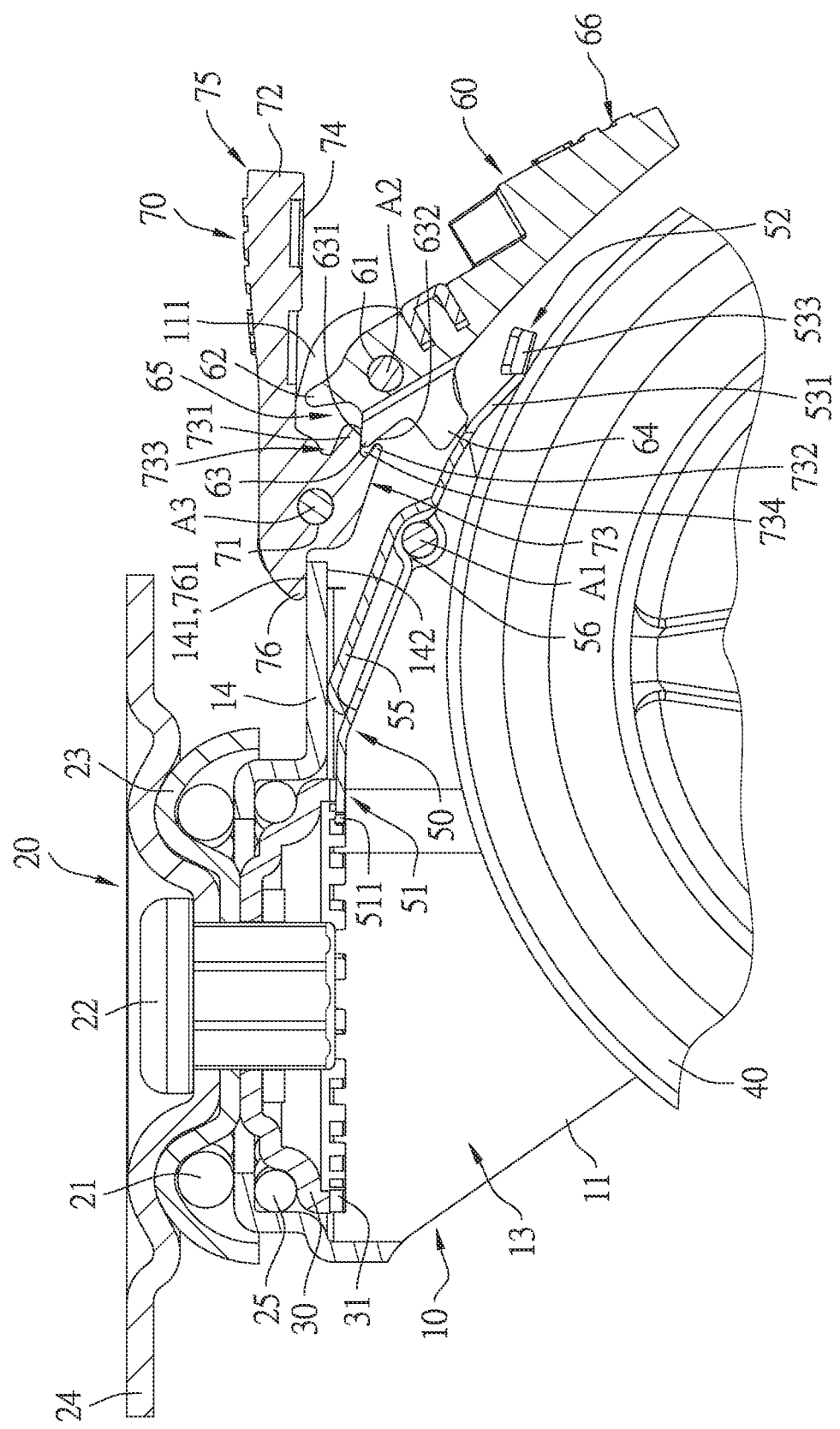
FIG. 5 is a cross-sectional view of the first state of the castor structure with a brake pad in accordance with the present invention.
Figure 6:
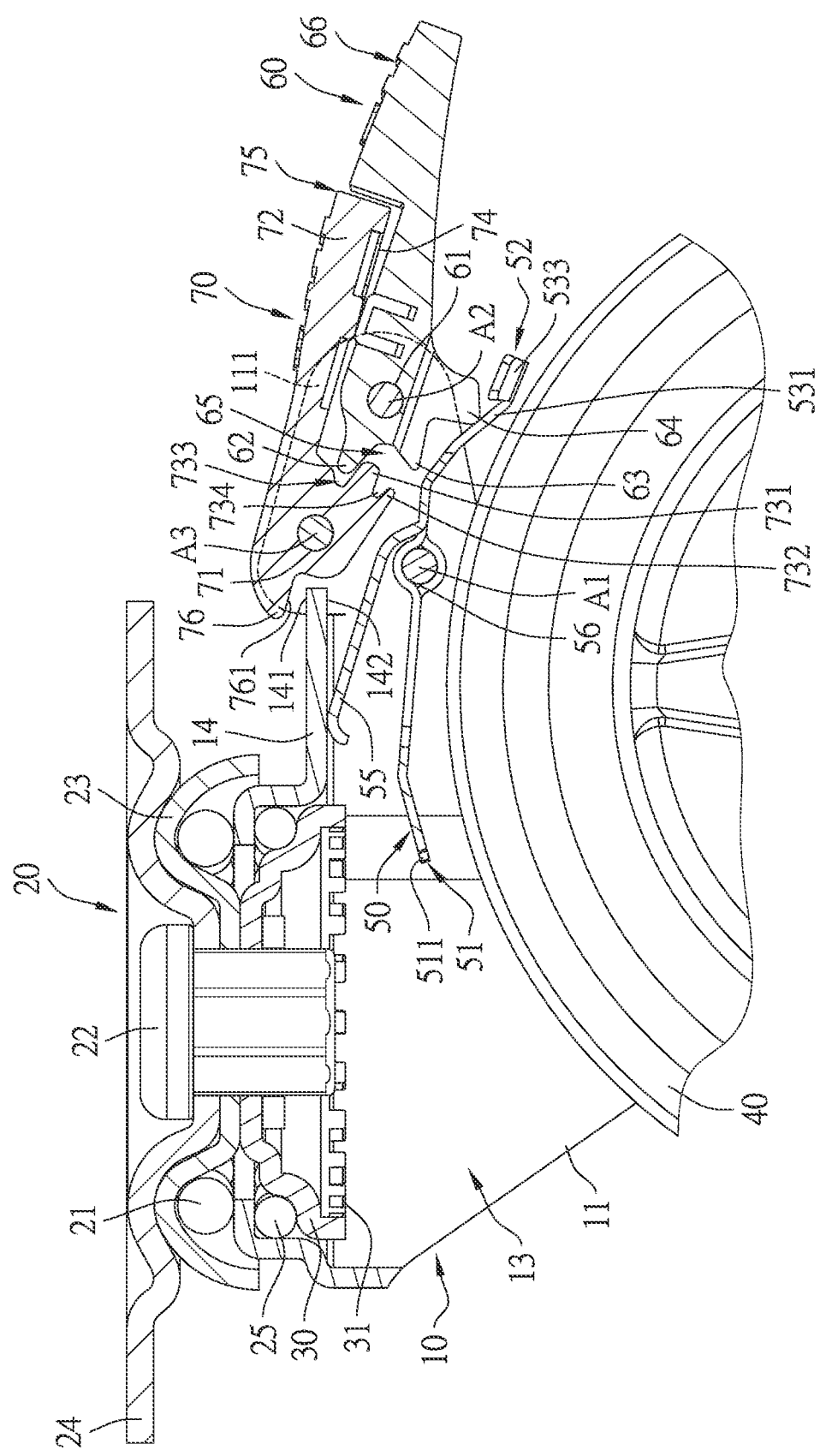
FIG. 6 is a cross-sectional view of the second state of the castor structure with a brake pad in accordance with the present invention.
Figure 7:
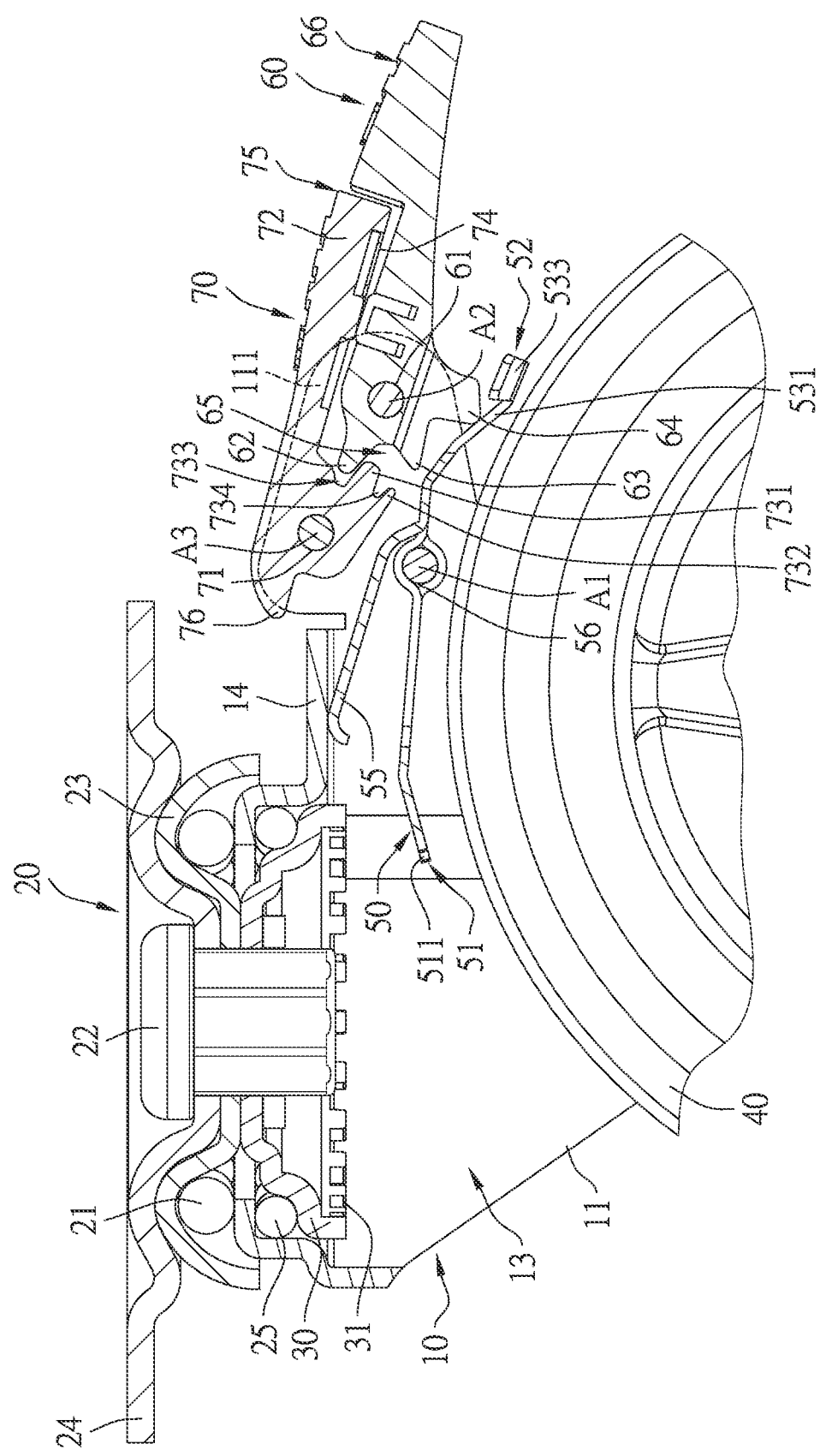
FIG. 7 is a cross-sectional view of a preferred embodiment of the castor structure with a brake pad in accordance with the present invention.
Figure 8:
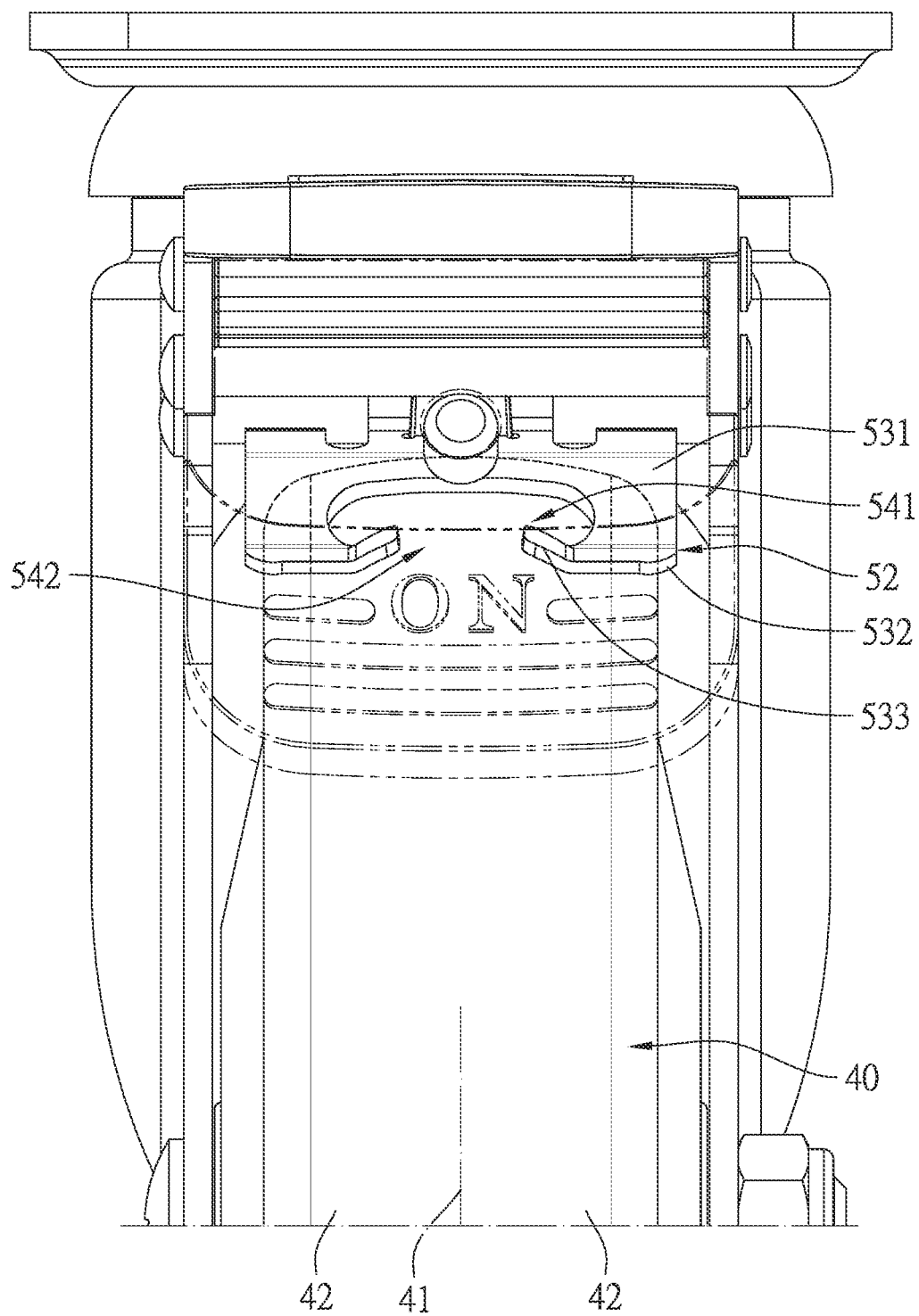
FIG. 8 is a rear view of the castor structure with a brake pad in accordance with the present invention.

In a preferred embodiment, referring to FIGS. 5 and 6, a limit stop portion 14 extends from the housing 10 and is located between the two coupling portions 111. The limit stop portion 14 includes a first side surface 141 and a second side surface 142 opposite to each other. The second side surface 142 faces the brake pad 50. The working end of the brake-release pedal 70 includes a stepping end 75, and the force-receiving end of the brake-release pedal 70 includes a limiting end 76. The limiting end 76 includes a limiting end surface 761 for abutting against the first side surface 141, so that the brake-release pedal 70 pushes against the first side surface 141 when it is not stepped on, so as to prevent the brake-release pedal 70 from rotating excessively beyond the predetermined stroke, thereby avoiding the negative effect caused by the brake-release pedal 70 rotating beyond the predetermined stroke. That is, the first convex portion 731 is disengaged away from the top surface 631, so that the brake pedal 60 cannot be effectively reset when the brake-release pedal 70 is stepped on.

The above is the structural configuration and characteristics of the castor structure with a brake pad of the present invention, and the specific operation mode is described as follows and please refer to FIGS. 5 and 6:

Please refer to FIG. 5, in the braking state, the user steps down on the brake pedal 60 to make the brake pedal 60 pivot around the second pivot A2, and the pressing portion 64 of the brake pedal 60 presses against the force-receiving sections 531 of the brake portions 53, so that the fixing sections 532 or the pressing sections 533 of the brake portions 53 press against the wheel-side portions 42 of the wheel body 40, and the braking action is achieved by friction. Meanwhile, the locking teeth 511 of the first end 51 of the brake pad 50 mesh with the teeth 31 of the toothed wheel 30, so that the toothed wheel 30 is simultaneously locked by the brake pad 50 to restrict the pivot shaft 22 from pivoting.

In addition, the fixing sections 532 and the pressing sections 533 of the brake pad 50 press against the two wheel-side portions 42 of the wheel body 40, so in addition to providing friction, it can also provide clamping function, as a result, the braking effect can be achieved more easily, and the braking force tends to be even. Furthermore, because the fixing sections 532 and the pressing sections 533 of the brake pad 50 press against the two wheel-side portions 42 instead of pressing against the center of the wheel body 40, so no extra resistance is generated, and there is no excess wear, thereby extending the service life of the wheel body 40.

When the braking state is to be released, please refer to FIG. 6, the user only needs to step down on the brake-release pedal 70. At this time, the brake-release pedal 70 rotates around the third pivot A3 and drives the first convex portion 731 to rotate, and the first convex portion 731 presses the limiting portion 63 to drive the brake pedal 60 to pivot and reset. At this time, the brake pad 50 loses the pushing of the pressing portion 64, the elastic portion 55 provides the kinetic energy for the reset of the brake pad 50, and drives the brake pad 50 to pivot around the first pivot A1, so that the locking teeth 511 of the second end 52 of the brake pad 50 is then disengaged from the toothed wheel 30, and the wheel body 40 is restored to a freely rotatable and pivotable state.

It can be seen from the foregoing that the present invention has the elastic portion 55 between the first end 51 and the second end 52, the elastic portion 55 is extension of the integral brake pad 50, and the elastic portion 55 is resilient and elastic, so it can not only reduce the required components, but also reduce the assembly process.

While we have shown and described various embodiments in accordance with the present invention, it is clear to those skilled in the art that further embodiments may be made without departing from the scope of the present invention.

What is claimed is:

1. A castor structure with a brake pad, comprising:
a housing including two side walls and a through hole, wherein a space is defined between the two side walls, and each of the two side walls includes a coupling portion;
a pivoting unit including a ball unit, a pivot shaft, and an upper cover, wherein the ball unit is fixedly disposed inside the upper cover, the pivot shaft is inserted in the upper cover, and the upper cover is disposed in the through hole and fixed to the housing;
a toothed wheel disposed in the housing and including a plurality of teeth, wherein the pivot shaft is inserted through the toothed wheel;
a wheel body pivotally disposed between the two side walls of the housing and having a thickness, wherein a central line is defined at half the thickness of the wheel body, and portions of the wheel body at two sides of the central line are two wheel-side portions;
the brake pad including a first end and a second end opposite to each other, wherein the first end is formed with a plurality of locking teeth for engaging with the teeth of the toothed wheel, the second end includes two opposite braking portions, each of the two braking portions includes a force-receiving section, a fixing section, and a pressing section respectively, a space is defined between the two force-receiving sections, a gap is formed between the two pressing sections and in communication with the space of the brake pad, one end of each of the force-receiving sections connected to a corresponding one of the fixing sections is a first connecting end, another end of each of the force-receiving sections is a second connecting end, the first connecting end is closer to the wheel body than the second connecting end, one end of each of the pressing sections is connected to a corresponding one of the fixing sections, another end of each of the pressing sections faces a brake pedal or a brake-release pedal, each of the pressing sections is inclined with respect to a corresponding one of the fixing sections, an elastic portion is disposed between the first end and the second end, one end of the elastic portion is connected between the first end and the second end, another end of the elastic portion abuts against the housing, and a shaft hole is formed between the first end and the second end;

a first pivot inserted through the shaft hole of the brake pad, and including one end fixed to the coupling portion of one of the side walls, and another end fixed to the coupling portion of another of the side walls;

one end of the brake pedal including a first inserting hole, an abutting portion, a limiting portion and a pressing portion, wherein a recess is formed between the abutting portion and the limiting portion, the brake pedal is accommodated between the two side walls, the pressing portion of the brake pedal faces the force-receiving sections and is provided for pushing the force-receiving sections;

a second pivot inserted through the first inserting hole, and including one end fixed to the coupling portion of one of the side walls and another end fixed to the coupling portion of another of the side walls;

the brake-release pedal including a force-receiving end and a working end, the working end including a second inserting hole, wherein the brake-release pedal includes a paddle portion and a body portion, the body portion is formed on one side of the paddle portion, the second inserting hole runs through the body portion, the body portion includes a first convex portion and a second convex portion, a first concave portion is formed between the paddle portion and the first convex portion, a second concave portion is formed between the first convex portion and the second convex portion, the first concave portion is provided for receiving the abutting portion, the second concave portion is provided for accommodating the limiting portion, the limiting portion is provided for abutting against the first convex portion, and the brake-release plate is disposed between the two side walls; and a third pivot inserted through the second inserting hole, and including one end fixed to the coupling portion of one of the side walls and another end fixed to the coupling portion of another of the side walls.

2. The castor structure with the brake pad as claimed in claim 1, wherein the first pivot, the second pivot, and the third pivot are equal in length.

3. The castor structure with the brake pad as claimed in claim 1, wherein a mounting plate is mounted to the pivoting unit.

4. The castor structure with the brake pad as claimed in claim 1, wherein each of the fixing sections extends along a transverse direction, and the shaft hole extends along the transverse direction as well.

5. The castor structure with the brake pad as claimed in claim 1, wherein another end of the brake pedal is provided with a plurality of anti-slip grooves on an outer surface thereof.

6. The castor structure with the brake pad as claimed in claim 1, wherein the limiting portion includes a top surface and a bottom surface opposite to each other, the top surface is provided for abutting against the first convex portion, the bottom surface is provided for abutting against the second convex portion, when the brake pedal is stepped on by a user, the top surface pushes against the first convex portion, and the second convex portion engages with the bottom surface.

7. The castor structure with the brake pad as claimed in claim 1, wherein a limit stop portion extends from the housing and is located between the two coupling portions, the limit stop portion includes a first side surface and a second side surface opposite to each other, the second side surface faces the brake pad, the working end end of the brake-release pedal includes a stepping end, the force-receiving end of the brake-release pedal includes a limiting end, and the limiting end includes a limiting end surface for abutting against the first side surface.

* * * * *